US006873747B2

(12) United States Patent
Askary

(10) Patent No.: US 6,873,747 B2
(45) Date of Patent: Mar. 29, 2005

(54) METHOD FOR MEASUREMENT OF PITCH IN METROLOGY AND IMAGING SYSTEMS

(76) Inventor: Farid Askary, 1750 Halfor Ave., No. 218, Santa Clara, CA (US) 95051

(*) Notice: Subject to any disclaimer, the term of this patent is extended or adjusted under 35 U.S.C. 154(b) by 586 days.

(21) Appl. No.: 09/911,763

(22) Filed: Jul. 23, 2001

(65) Prior Publication Data

US 2002/0034338 A1 Mar. 21, 2002

Related U.S. Application Data

(60) Provisional application No. 60/220,604, filed on Jul. 25, 2000.

(51) Int. Cl.[7] .................................................. G06K 9/32
(52) U.S. Cl. ..................................... 382/295; 382/276
(58) Field of Search ............................... 382/278, 286, 382/141, 143, 146, 147, 300, 295, 277; 348/86, 87, 92, 94, 135, 136; 250/252.1, 310, 419.1, 307

(56) References Cited

U.S. PATENT DOCUMENTS

| | | | |
|---|---|---|---|
| 4,818,873 A | | 4/1989 | Herriot ........................ 250/310 |
| 5,644,512 A | | 7/1997 | Chernoff et al. ........ 364/571.02 |
| 6,384,408 B1 | * | 5/2002 | Yee et al. .................. 250/252.1 |
| 6,570,157 B1 | * | 5/2003 | Singh et al. ................. 250/311 |
| 6,653,634 B1 | * | 11/2003 | Otaka et al. ................ 250/311 |
| 6,661,007 B1 | * | 12/2003 | Sicignano et al. .......... 250/307 |

OTHER PUBLICATIONS

Ronald Dixson et al, National Institute of Standards and Technology, "Dimensional Metrology with the NIST Calibrated Atomic Force Microscope", Proceedings of SPIE, vol. 3677, pp. 20–34, 1999.

S.R. Dooley et al, "Comparison of discrete subsample time delay estimation methods applied to narrowband signals", Measurement Science and Technology, vol. 9, pp. 1400–1408, 1998.

Scott C. Douglas, "A Frequency Domain Subpixel Position Estimation Algorithm for Overlay Measurement", Proceedings of SPIE, vol. 1926, pp. 402–405, 1993.

D. M. Holburn et al, "A Pattern Recognition Technique Using Sequence of Marks for Registration in Electron Beam Lithography", Journal of Vacuum Science and Technology, vol. 19(4), pp. 1229–1233, 1981.

(Continued)

Primary Examiner—Yon J. Couso
(74) Attorney, Agent, or Firm—Townsend and Townsend and Crew LLP

(57) ABSTRACT

In accordance with an embodiment of the invention, a method for measuring pitch in data obtained from metrology and imaging systems is provided. A data set from a metrology or imaging instrument is obtained. The data set is converted into digital format if not already in that format. The digitized data set is mapped into a one-dimensional profile data if the digitized data set is not already one-dimensional. The one-dimensional profile data denoted by f(x) is a function of x position values corresponding to equally spaced or nearly equally spaced pixels. A criteria function g(T) is constructed as a one-dimensional data array from the profile data f(x) or any of its derivatives and a translation of the profile data f(x) denote by f(x+T) or any of its derivatives. Here, T represents the amount of translation, and g(T) is a function of T translation values corresponding to equally spaced or nearly equally spaced pixels. A value of translation T is then determined either as a whole pixel or with subpixel interpolation such that the magnitude of g(T) would be either a maximum or a minimum whichever appropriate at said value, wherein the determined value is not zero. The determined value is then reported as the pitch in the data set.

22 Claims, 5 Drawing Sheets

OTHER PUBLICATIONS

Fumio Mizuno et al, "Evaluation of the long–term stability of critical–dimension measurement scanning electron microscopes using a calibration standard", Journal of Vacuum Science and Technology B, vol. 15(6), pp. 2177–2190, 1997.

Anatoly Shchemelinin et al, "Basic Challenges of Optical Overlay Measurement", Proceedings of SPIE, vol. 3050, pp. 425–431, 1997.

J.S. Villarubia et al, National Institute of Standards and Technology, "Intercomparison of SEM, AFM, and Electrical Linewidths", Proceedings of SPIE, vol. 3677, pp. 587–597, 1999.

Alexander I. Zaslavsky, "Overlay Measurement and Edge Detection Methods", Proceedings of SPIE, vol. 3050, pp. 418–424, 1997.

N. F. Zhang et al, National Institute of Standards and Technology, "A New Algorithm for the Measurement of Pitch in Metrology Instruments", Proceedings of SPIE, vol. 2725, pp. 147–158, 1996.

* cited by examiner

Translation

Pitch

Performance Comparison - Pitch Measurement Precision
Present Method versus Existing Algorithm Pitch Measurement (nm)
Existing Algorithm, Commercially Available Scanning Electron Microsocpe

|  | Meas. #1 | Meas. #2 | Meas. #3 | Meas. #4 | Meas. #5 | Meas. #6 | Meas. #7 | Meas. #8 |
|---|---|---|---|---|---|---|---|---|
| Site 1, Cycle 1 | 699.1 | 701.2 | 699.9 | 700.2 | 700.0 | 700.1 | 699.3 | 698.5 |
| Site 2, Cycle 1 | 701.2 | 699.7 | 700.7 | 701.6 | 702.1 | 701.7 | 701.3 | 700.3 |
| Site 3, Cycle 1 | 704.3 | 703.2 | 703.0 | 703.5 | 702.6 | 702.7 | 703.6 | 701.8 |
| Site 4, Cycle 1 | 696.9 | 695.1 | 695.5 | 695.2 | 696.2 | 695.0 | 694.7 | 695.3 |
| Site 5, Cycle 1 | 699.7 | 698.2 | 699.0 | 698.8 | 699.2 | 700.2 | 698.6 | 701.0 |
| Site 6, Cycle 1 | 699.7 | 699.0 | 701.9 | 699.5 | 699.1 | 701.1 | 699.3 | 699.7 |
| Site 7, Cycle 1 | 695.5 | 696.2 | 694.9 | 696.0 | 695.7 | 695.1 | 695.8 | 695.8 |
| Site 8, Cycle 1 | 703.6 | 704.3 | 704.9 | 704.2 | 704.5 | 702.9 | 703.2 | 703.6 |
| Site 1, Cycle 2 | 698.4 | 697.9 | 698.4 | 697.5 | 698.2 | 698.3 | 698.9 | 698.1 |
| Site 2, Cycle 2 | 696.9 | 696.8 | 696.3 | 697.3 | 696.4 | 697.4 | 697.1 | 697.8 |
| Site 3, Cycle 2 | 700.2 | 698.7 | 699.2 | 699.0 | 699.3 | 699.0 | 699.1 | 699.5 |
| Site 4, Cycle 2 | 697.6 | 697.4 | 697.8 | 697.8 | 697.2 | 697.6 | 697.3 | 697.7 |
| Site 5, Cycle 2 | 693.6 | 694.1 | 693.0 | 693.3 | 694.0 | 693.5 | 693.6 | 693.4 |
| Site 6, Cycle 2 | 699.4 | 700.8 | 701.4 | 699.3 | 700.2 | 699.9 | 700.3 | 700.1 |
| Site 7, Cycle 2 | 700.1 | 700.8 | 700.5 | 699.9 | 699.4 | 700.3 | 699.0 | 699.7 |
| Site 8, Cycle 2 | 697.7 | 696.7 | 697.4 | 697.8 | 697.9 | 697.3 | 697.4 | 698.1 |

Average: 698.8  Total Variance: 7.35
Total Pitch Measurement Precision - Three Standard deviaitons (nm): 8.13

Pitch Measurement (nm)
Present Method - Calculated from the identical experimental scan profiles as in above

|  | Meas. #1 | Meas. #2 | Meas. #3 | Meas. #4 | Meas. #5 | Meas. #6 | Meas. #7 | Meas. #8 |
|---|---|---|---|---|---|---|---|---|
| Site 1, Cycle 1 | 700.48 | 700.35 | 700.37 | 700.36 | 700.34 | 700.23 | 700.28 | 700.26 |
| Site 2, Cycle 1 | 699.86 | 700.07 | 699.61 | 699.82 | 699.83 | 700.10 | 700.03 | 700.05 |
| Site 3, Cycle 1 | 699.76 | 699.63 | 699.60 | 699.50 | 699.43 | 699.45 | 699.51 | 699.33 |
| Site 4, Cycle 1 | 700.01 | 700.07 | 699.73 | 699.95 | 699.88 | 699.82 | 699.82 | 699.73 |
| Site 5, Cycle 1 | 699.03 | 699.29 | 699.06 | 699.13 | 699.12 | 699.01 | 699.01 | 699.20 |
| Site 6, Cycle 1 | 701.22 | 701.28 | 701.41 | 701.12 | 701.28 | 701.35 | 701.34 | 701.45 |
| Site 7, Cycle 1 | 698.97 | 698.88 | 698.66 | 698.91 | 698.79 | 699.00 | 698.67 | 698.58 |
| Site 8, Cycle 1 | 700.02 | 700.00 | 699.69 | 699.66 | 699.65 | 699.60 | 699.23 | 699.45 |
| Site 1, Cycle 2 | 698.35 | 698.18 | 698.49 | 698.32 | 698.22 | 698.53 | 698.64 | 698.60 |
| Site 2, Cycle 2 | 699.84 | 699.61 | 699.49 | 699.61 | 699.37 | 699.68 | 699.69 | 699.80 |
| Site 3, Cycle 2 | 699.49 | 699.42 | 699.38 | 699.39 | 699.38 | 699.40 | 699.19 | 699.24 |
| Site 4, Cycle 2 | 699.56 | 699.98 | 699.81 | 699.99 | 699.71 | 699.92 | 700.03 | 699.56 |
| Site 5, Cycle 2 | 699.51 | 699.29 | 699.45 | 699.25 | 699.23 | 699.36 | 699.22 | 699.29 |
| Site 6, Cycle 2 | 700.30 | 700.29 | 700.25 | 700.19 | 700.22 | 699.89 | 700.16 | 700.02 |
| Site 7, Cycle 2 | 701.71 | 701.57 | 701.75 | 701.67 | 701.73 | 701.53 | 701.41 | 701.33 |
| Site 8, Cycle 2 | 699.98 | 699.68 | 699.79 | 699.57 | 699.76 | 699.60 | 699.49 | 699.42 |

Average: 699.8  Total Variance: 0.64
Total Pitch Measurement Precision - Three Standard deviaitons (nm): 2.40

FIG. 5

METHOD FOR MEASUREMENT OF PITCH IN METROLOGY AND IMAGING SYSTEMS

CROSS-REFERENCES TO RELATED APPLICATIONS

This application claims the benefit of U.S. Provisional Application No. 60/220,604, filed Jul. 25, 2000, which disclosure is incorporated by reference.

BACKGROUND OF THE INVENTION

Pitch measurement is the measurement of the distance between two similar features. This definition applies to both the physical specimen and its image, that is, the corresponding data set collected from the specimen using a metrology or imaging system. The sample pitch is the spacing of similar elements in a specimen such as a grating. In most metrology and imaging systems, when a specimen with known sample pitch is measured or imaged, the spacing between similar features is rendered in the data set or image and the pitch in such data set or image can be used to determine the scale in the data set, for example, the magnification of the image. Thus, pitch measurement can be used for metrology or imaging system calibration to set the scale. If the scale is known in advance of data collection, a measurement of the sample pitch in a specimen with otherwise unknown pitch can be obtained from the pitch in the data set collected from the sample.

Prior art methods for pitch measurement in metrology and imaging systems fall into two categories. In the first category of prior art, measurement methods determine the pitch in the data set in a manner similar to linewidth measurement. Hence, a discussion of linewidth measurement methods follows.

In most metrology and imaging systems the signal is formed as a result of interaction of excitations with a specimen or sample and the detection of all or part of the signal generated as a result of the interaction. The excitations, in some cases referred to as probes, can be mechanical probes, electrons, photons, ions, phonons or other forms of radiation. In magnetic resonance imaging, for example, the excitations are magnetic field pulses. The detected signal can consist of charged particles, photons, phonons, or other observables such as temperature or field amplitude. What is common among most metrology and imaging systems is that they all create one, two, or three dimensional spatial images of specimen. That is, the systems produce a vector function f of the spatial coordinates r in some region of the space. The function f describing the signal can be a function of one, two, or three dimensional coordinates as f(x), f(x,y), or f(x,y,z). In addition, the function f can be a vector itself having several components. For example, a color image is represented as three functions over space: red, green and blue. These systems often produce information that is stored in computer memory in some digital format as a single column or multidimensional matrices or graphics formats for images, though the method of pitch measurement also applies to continuous signals such as photographs since they can be scanned and converted into digital forms. The data collected from metrology or imaging instruments will be referred to as a data set. This term includes gray scale images obtained from any number of systems such as CCD cameras and scanning electron microscopes. The one-dimensional data is referred to as a profile data. This term is intended to include scan lines collected with scanning probe microscopes or other scanning instruments capable of producing such data.

The features in a data set are rendered from features on the sample, though sometimes such data set features can result from noise in the scan or other electronics or from environmental factors such as vibration and other interferences. When data set features correspond to those of the sample, information about the physical features is obtained from their rendition in the collected data. In the ideal case, the feature as rendered in the data set would contain information that is identical to that of the physical feature. However, metrology and imaging systems have imperfections consisting of, but not limited to, sharpness of excitation (probe sharpness), finite interaction volume of excitation and sample, detection limits and inefficiencies, finite depth of focus, signal to noise ratio limitations, diffraction, and image distortion. In the data set, the portions of the data set formed from the sharp edges of physical sample features are smeared by these imperfections.

As an example, consider a specimen such as a diffraction grating, which consists of a series of parallel lines of equal width and equal spaces between the lines. Further assume that the metrology or imaging acquires data from a portion of the specimen consisting of parts of two or more lines. The linewidth measurement is the determination of the distance between the two edges of a physical feature, for example, the left edge and the right edge of a line in a diffraction grating. In the data set, linewidth or feature width measurement is essentially the distance between the corresponding two edges in the data set. Therefore, methods of measuring the width of a physical feature are based on methods that determine the position of two edges in the data set. With such metrology and imaging systems, the problem is in determining where the actual edge location lies along a complex waveform of the detected signal. Sometimes, the edge position in the data set is modeled based on the physics of the system and the particular experimental conditions including probe-sample interactions. But more often, the edge position in the data set is assigned by applying any number of arbitrary edge detection algorithms to the data set or a representation of the data set. Common edge detection algorithms are threshold (absolute or percentage), maximum derivative or slope, second derivative, s curve fit, linear regression, peak-to-peak distance, and centroid-to-centroid distance. All these algorithms consider a transition in the detected signal (low-to-high or high-to-low transition, or the combination of the two) and assign to some point in the signal transition interval a pixel position which is designated as the edge location in the data set, and hence corresponds to the feature edge location in the sample. Generally these methods implement subpixel interpolation schemes. The net result of smearing and arbitrary edge assignment is that the linewidth measurement tends to be biased and suffers from lack of accuracy.

The methods in the first category of prior art for pitch measurement are nearly identical to linewidth measurement as described above. The pitch in the data set is measured as the difference between the locations of two similar edges of the same type in the data set. That is, a left-edge to left-edge distance or a right-edge to right-edge distance, or peak-to-peak distance and so on. This type of prior art is depicted in FIG. 1, where the original data set (not shown) is reduced to a one-dimensional profile data 2. In this example, transitions in the profile data represent the edges in the sample. Two similar edge regions 12 and 14 (both left edges in this example) in the profile data are determined. The pixel positions 16 and 18 of the two similar edges 12 and 14 are considered. The positions 16 and 18 are determined by application of any one of edge detection algorithms identical to the algorithms used for edge position determination in linewidth measurement listed before. The pitch in the data set is then calculated as the difference between the position of two similar edges in the data set, P=r2−r1, where P is the measured pitch in the data set, r1 is the pixel location 16 of the first edge as determined by a particular algorithm, and r2 is the pixel location 18 of the second edge as determined by the same algorithm. The edge pixel positions are often determined to a subpixel range of values by interpolation. In summary, the first category of prior art requires determination of two similar edge positions in the data set.

The smearing of the features in the image or data set affects linewidth and pitch measurements differently. In a linewidth measurement, the results depend on the magnitude of the broadening of the edge in the data set as caused by the particular physical effects and experimental conditions that cause the broadening of the edges at the time of data collection. This fact is well known, and for this reason, image magnification calibration to the feature with a known width is not recommended and in modem metrology tools, instrument image magnification calibration is accomplished with measurement of pitch of a specimen with known physical pitch. Due to the fact that the smearing alters the two similar edges in the data set in a similar manner, the effects of broadening of the two edges tend to cancel out in pitch measurement. For this reason pitch measurements are referred to as self-compensating or unbiased. More specifically, such pitch measurements do not require a physical model for edge determination in order to be accurate and are far less sensitive to image imperfections arising from finite probe size (excitation-sample interaction volume). However, it is known in the prior art that all pitch measurement algorithms are not identical in performance. At issue is the undesired contribution of the measurement algorithm to the uncertainty of the pitch measurement. This contribution limits the precision or repeatability with which the pitch can be measured, and consequently the precision with which the scale of the metrology or imaging system can be calibrated.

The National Institute of Science and Technology (NIST) has developed a version of the pitch measurement algorithm belonging to the first category of prior art for use in scanning electron microscopes. This algorithm is described in an article entitled "A New Algorithm for the Measurement of Pitch in Metrology Instruments", N. F. Zhang et al, Proceedings of SPIE, Vol. 2725, pp. 147–158, 1996. In the NIST algorithm, the two edge locations are determined using regression to fit two straight lines to the signal in the transition regions for each edge, but the method places an additional restriction on the slopes of the lines fitted to the two similar edges in the data. The fitted lines must have identical slopes in the regression.

The second category of prior art consists of methods that apply Fourier transform to the data set as disclosed in U.S. Pat. No. 4,818,873 issued to Glen A. Harriot. These methods determine the location of the peak in the amplitude of the Fourier transform of the data set or detected signal. Since the peak in Fourier Transform of the signal corresponds to the fundamental spatial frequency in the image or data set, the position of this peak is assigned the special frequency of the pitch in the data set. This method works well for low magnification images containing several edge replications in the data set. When few repetitions of the periodic structure are present in the data set, the measurement method lacks precision.

While the prior art methods of pitch measurement have proved useful, they suffer from several disadvantages. The pitch measurement algorithms that are based on edge detection are more sensitive to noise and hence not very precise in determining the pitch. In addition, they require as input to the measurement, the conditions for edge detection, including specification of pixel search range intervals for finding each edge. In automated pitch measurement, there exists a requirement that the image of the features be aligned to the search ranges before applying the edge detection algorithm, otherwise the measurement will fail.

Accordingly, there is a need for methods of measuring pitch in the data set that can overcome or eliminate such inefficiencies and disadvantages, can be easier to use, can result in measurements that are more precise, more robust, more versatile, and do not require, but can accommodate, search ranges and can be extended to higher data dimensions.

SUMMARY

In accordance with an embodiment of the invention, a method for measuring pitch in data obtained from metrology and imaging systems is provided. A data set from a metrology or imaging instrument is first obtained. The data set is converted into digital format if not already in that format. The digitized data set is mapped into a one-dimensional profile data if the digitized data set is not already one-dimensional. The one-dimensional profile data denoted by $f(x)$ is a function of x position values corresponding to equally spaced or nearly equally spaced pixels. A criteria function $g(T)$ is constructed as a one-dimensional data array from the profile data $f(x)$ or any of its derivatives and a translation of the profile data $f(x)$ denote by $f(x+T)$ or any of its derivatives. Here, T represents the amount of translation, and $g(T)$ is a function of T translation values corresponding to equally spaced or nearly equally spaced pixels. A value of translation T is then determined either as a whole pixel or with subpixel interpolation such that the magnitude of $g(T)$ would be either a maximum or a minimum whichever appropriate at said value, wherein the determined value is not zero. The determined value is then reported as the pitch in the data set.

In another embodiment, the obtained data set is one or more image(s) of portions of a sample, and the one-dimensional profile data $f(x)$ is obtained from the image(s) through one or more mathematical operations including operations on the obtained data set or the one-dimensional profile data to reduce any noise in the data or to shift the average of the data or to remove any linear or higher order trend in the data, summing, averaging with or without weights, median, and averaging with data culling.

In another embodiment, the gray scale image is obtained by one of cameras including CCD cameras, optical microscopes, scanning electron microscope including top down, tilt, and cross section, scanning ion microscope; transmission electron microscope; microscopes in analytical instruments; defect detection and inspection microscopes whether optical or scanning electron; microscopes in lithography systems including ion beam, x ray, optical, UV, deep UV and extreme UV lithography systems, thermal imaging systems, medical imaging devices such as magnetic resonance imaging, CAT Scan; ultrasound and other imaging systems such as sonar.

In another embodiment, the criteria function $g(T)$ is constructed from the profile data $f(x)$ and a translation of the profile data $f(x)$ denote by $f(x+T)$ using autocorrelation of either the profile data $f(x)$ or any of its derivatives. The computation of $g(T)$ is performed with or without normalization of profile data f(x) or its derivatives, with or without subtracting a background level from profile data f(x) or its derivatives, with or without excluding portions of the profile data f(x) or its derivatives based on their magnitude, with or without shifts in the magnitude of the profile data f(x) or its derivatives, with or without background uniformity compensation in f(x) or its derivatives, with or without allowance for one or more regions in the argument of the profile data or its derivatives that can be defined to be excluded from the computations, and by either truncating the summation or zero padding or replication to represent the translated values of the profile data or its derivatives, or any combination thereof.

In another embodiment, one or more parameter(s) is reported to convey information about the quality of the reported pitch.

Other advantages and features of the present invention will be apparent from the accompanying drawings and the description thereof.

BRIEF DESCRIPTION OF THE DRAWINGS

FIG. 5 includes charts comparing the precision of a pitch measurement method in accordance with an exemplary embodiment of the present invention and an existing pitch measurement method from a commercially available metrology system.

DETAILED DESCRIPTION OF THE INVENTION

In accordance with an embodiment of the present invention, a method for measuring the pitch in any data set obtained from a metrology or imaging system is provided where such method does not rely on assigning edge locations, i.e., it does not involve application of edge detection algorithms. The method can be extended to data sets (images) in any number of dimensions. The data can be obtained from any imaging system such as cameras including CCD; optical microscopes; scanning electron microscopes including top down, tilt, and cross section; scanning probe microscopes including atomic force microscopes and profilometers; scanning ion microscopes; transmission electron microscopes; scanning optical microscopes; numerous other microscopes in analytical instruments, microscopes in lithography systems; defect detection and inspection microscopes whether optical or scanning electron; thermal imaging systems, medical imaging devices such as magnetic resonance imaging, CAT Scan; ultrasound and other imaging systems such as sonar.

Broadly, a pitch being defined as the distance between two similar objects in the data set, and the data set being represented by f(x) and its translation by an amount T represented by f(x+T), the pitch is determined as a specific value of translation denoted by P such that the signal f(x) resembles its translated form f(x+P) as closely as possible either for a restricted set of values of the argument x or for all x in the data set where overlap exists between the original data set and its translation.

The determination of pitch may include additional conditions such as range restriction for P. This definition of pitch is consistent with the period of repetitive structures. Computations without additional analysis or without imposing other conditions such as range restrictions can yield values of P that are an integer multiples of the period in the data set whenever the original data set contains more than two periods.

Figure 1:
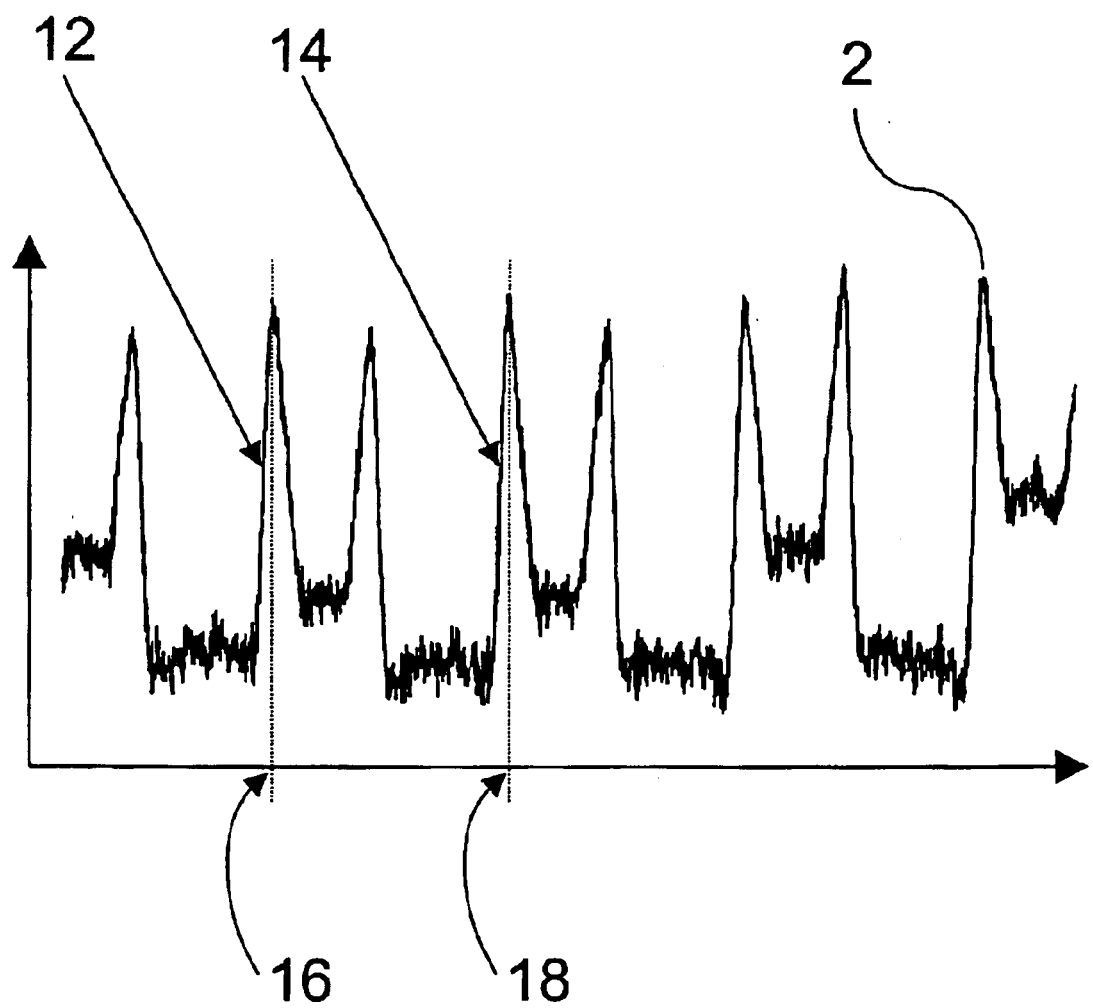
FIG. 1 is a description of prior art method for measuring pitch in the data.
Figure 2A:
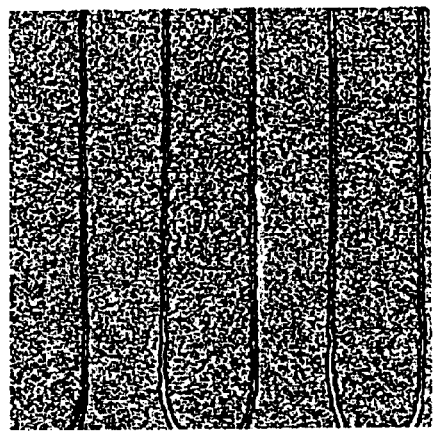
FIG. 2(a) illustrates an example of an image of a portion of a grating obtained with a scanning electron microscope.
Figure 2B:
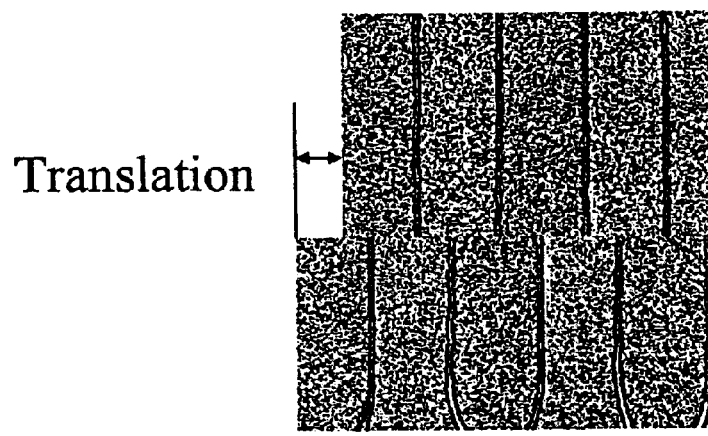
FIG. 2(b) depicts the shear and translation operations and is obtained from FIG. 2(a) by shearing the top portion of that image and translating it relative to the bottom portion by an arbitrary amount.
Figure 2C:
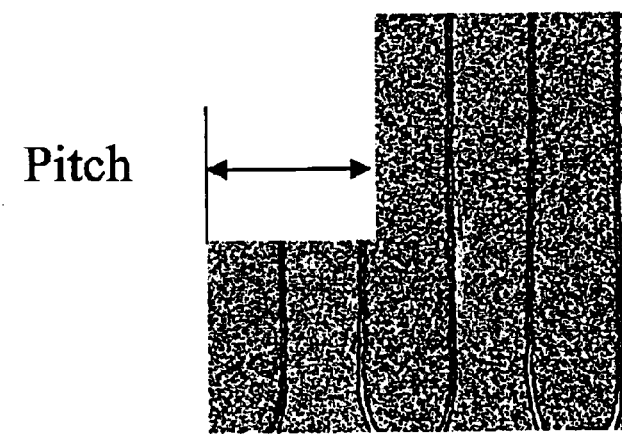
FIG. 2(c) illustrates a special case of shear and translation as described in FIG. 2(b) where the translation is equal to the pitch in the image.

Image shear technique provides a pictorial analogy of what the above mathematical construct strives to achieve. FIG. 2(a) depicts a top-down image of segments of three parallel lines form an imaging instrument. FIG. 2(b) depicts the image obtained from FIG. 2(a) when the top portion of the image is sheared and translated to the right by some arbitrary amount. FIG. 2(c) depicts the two images where the translation is equal to the pitch in the image. In FIG. 2(c), in the region where the two images overlap, the original image and its translation appear almost identical. In image shear techniques, perception by human brain is relied upon to measure distances. In accordance with an embodiment of the invention, a numerical method for performing a similar task under computer control is provided.

Accordingly, given that a continuous function f(x) represents the strength of the signal f as a function of the position x, then the function f(x+T) is the translation of that signal by an amount T, a function g(T) referred to as the criteria function is constructed from some relationship between f(x) or any of its derivatives and f(x+T) or any of its derivatives. The function g(T) is a function of the single variable T denoting the translation, and does not depend on any particular value of x denoting the argument of the function f( ). For one-dimensional data, an example of the function g(T) can be given as:

$$g_1(T) = \int |f(x) - f(x+T)| dx$$

In this example, g1(T) is the integral of the absolute value of the difference between the original signal and its translation. Thus, g1(T) is a quantity that depends on the amount of translation T, and not any edge position. A particular value of translation denoted as P is determined so as to minimize the criteria function, g1 in this example. That is, g1(P) is the minimum of g1(T) in the range of values considered for the translation amount T.

Another example for the criteria function g(T) is given below as g2(T) which is the integral of the square of the difference between the signal and its translation:

$$g_2(T) = \int (f(x) - f(x+T))^2 dx$$

Minimization of the above function results in maximizing the autocorrelation function of the original signal f( ). Thus, the position of the peak away from zero in the autocorrelation function corresponds to the measured pitch value.

For discrete or digital signal, that is, for a signal f( ) that is sampled at regular or nearly regular intervals of its argument x, the above integrals are replaced with finite summations. Any criteria functions g(T) will be a discrete function of T. In practice, the pitch P in the data set can be determined to a subpixel level using interpolation.

Figure 3:
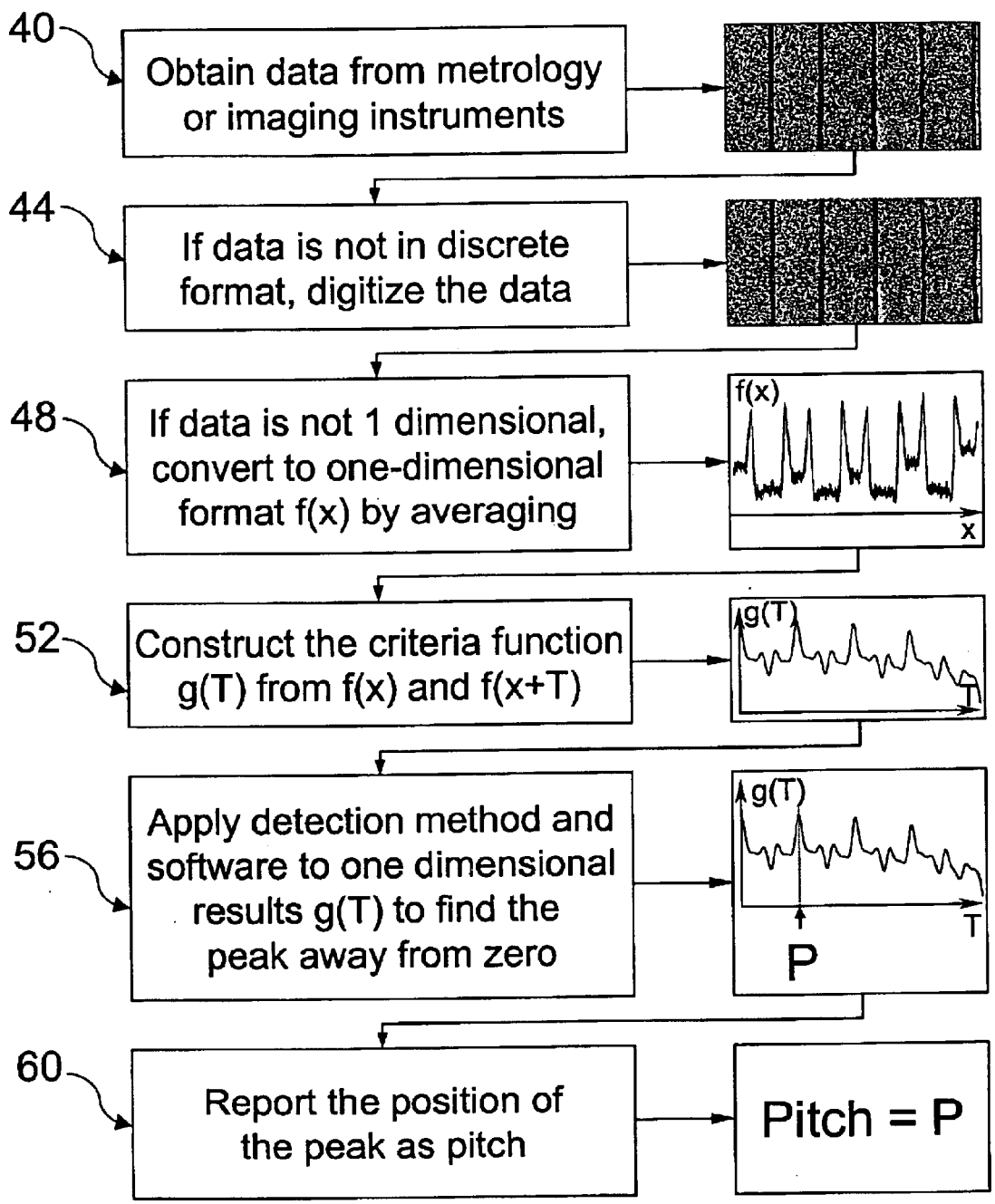
FIG. 3 is a block diagram illustrating steps in a method for calculating pitch in the data obtained from metrology or imaging systems in accordance with an embodiment of the present invention.

FIG. 3 is a block diagram illustrating steps in a method for calculating pitch in the data obtained from metrology or imaging systems in accordance with an embodiment of the present invention. First, in step 40 a data set is obtained from a metrology or imaging system. Usually, the data sets appear in digital format and are stored in that fashion in computer memory; for example, images obtained from a scanning electron microscope or scan lines obtained from a scanning probe microscope. However, if the data set is not in digital format, it is converted to the discrete form in step 44 where it is represented by an array of data, the array often being one or two dimensional, but possibly having more dimensions. If the digital data array is multidimensional, the entire data array or a portion thereof is mapped into a one dimensional data profile in step 48. Often straight averaging is used, as commonly practiced in scanning electron microscopes, to create the data profile denoted by f(x) from a portion of the image, but more complicated mathematical operations can be used such as averaging with weights. In some circumstances, the data array may be aligned prior to averaging to overcome the effects of drift in the data set. The data profile f(x) is a discrete function of x position values corresponding to substantially equally spaced pixels. In step 52, a criteria function g(T) is constructed from the data profile f(x) or any of its derivatives and the translation of the data profile f(x) denoted by f(x+T) or any of the derivatives of the translated profile. The details of forming the criteria function were discussed earlier. Integration or summing over a range of position x values is necessary so that the criteria function is not dependent on the value of x as an argument of a function. In step 56, the location of the peak or trough in the criteria function is determined possibly to a subpixel level using interpolation. The position of the peak or trough, whichever appropriate, is reported as the pitch in the data set in step 60.

Figure 4:
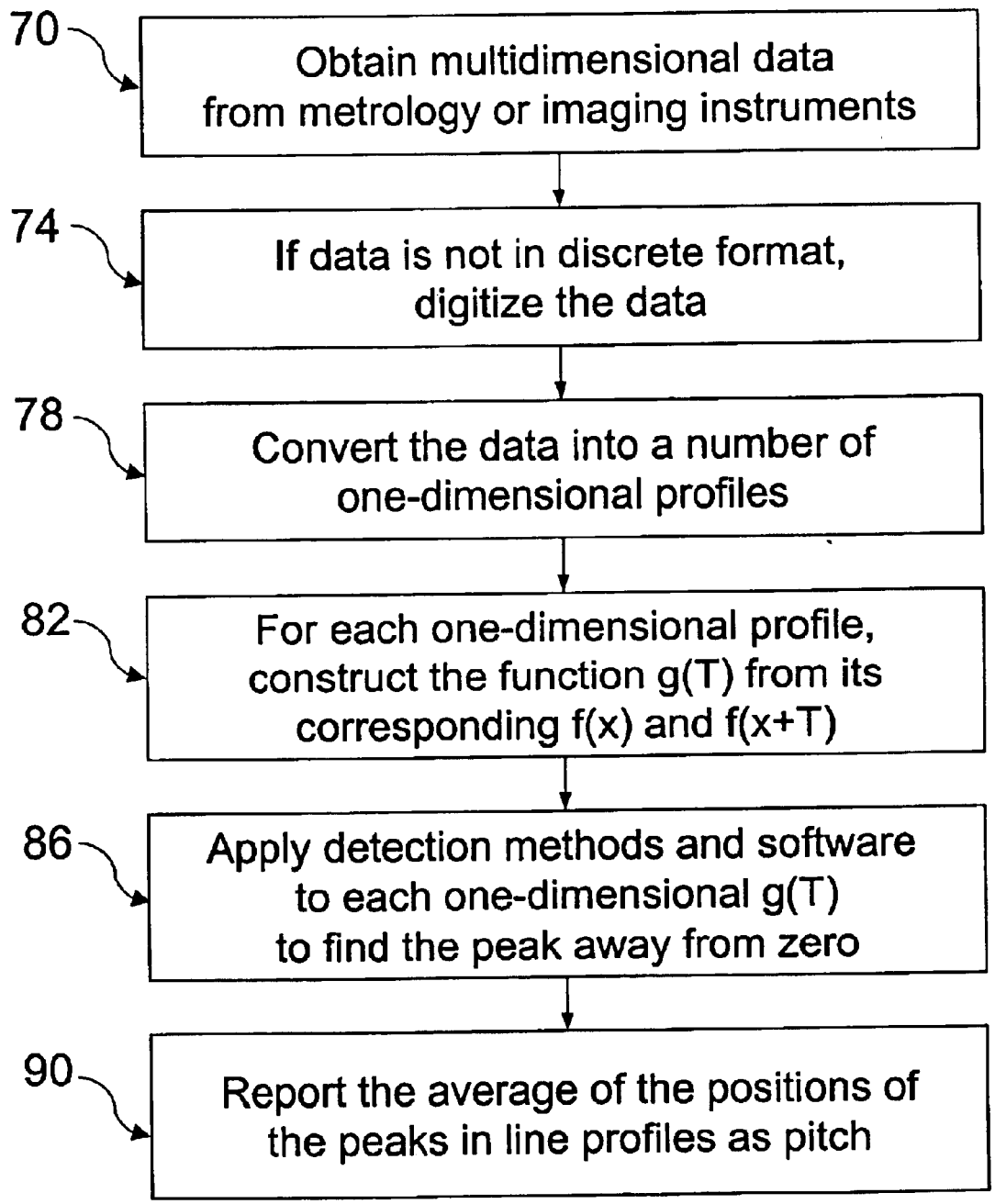
FIG. 4 is a block diagram illustrating steps in a method in accordance with another embodiment of the present invention for calculating pitch in the data obtained from metrology or imaging systems.

FIG. 4 is a block diagram illustrating steps in a method in accordance with another embodiment of the present invention for calculating pitch in the data obtained from metrology or imaging systems. Step 70 is similar to step 40 of FIG. 3. However, the data set is assumed to contain more than a single one-dimensional data profile. Examples of such data sets include a sequence of one-dimensional scan lines obtained from a scanning probe microscope or a two dimensional image from a scanning electron microscope. Step 74 is similar to step 44 of FIG. 3 where the data set is converted into digital format if necessary. In step 78, the data set is mapped into a number of individual data profiles f(x). In our examples, each individual line scan from the scanning probe microscope could be considered separately, or the scan lines can be averaged in groups of two or more resulting in a number of averaged profiles. A similar construct can be applied to an image from a scanning electron microscope where the image is divided in a number of stripes and the scan lines within each stripe are averaged to yield a number of one-dimensional data profiles, one for each stripe. This is in contrast to the method of FIG. 3 where in step 48, only a single one-dimensional data profile was obtained from the data set. For each data profile thusly obtained in step 78, a corresponding criteria function is formed in step 82, and the position of either the maximum or minimum, whichever appropriate, of each criteria function is found in step 86 in a manner similar to step 56 of FIG. 3. Finally, in step 90, the pitch in the data set is reported as either the average of all such positions, or another suitable statistical function of such positions, for example, median.

The methods of present invention cover maximization or minimization of any reasonable criteria function g(T) to determine pitch. This approach avoids individual edge position assignment and instead, uses a range in x of the signal f( ) to determine the pitch. The present invention includes but is not limited to maximum autocorrelation of the signal. Other examples are autocorrelation of the derivative or functions similar to g1 as mentioned before, or any of these functions with weights included in the integrand. For any given criteria function g(T), any number of methods can be used to find the maximum or the minimum. As an example, when the criteria function is autocorrelation, Fourier transform methods together with application of Parseval's theorem can be used to find the autocorrelation peak position in space from the position of the peak in spatial frequency domain.

Maximum cross correlation technique is commonly used in several disciplines such as time delay measurement, overlay measurement, and pattern recognition, that is, finding objects in a target image. Based on the known properties of cross correlation and depending on the nature of the detected signal, the autocorrelation technique can be the method that provides the lower bound on the precision of determining the pitch in the data set. That is, the autocorrelation algorithm can produce pitch measurements with best precision for a given set of experimental conditions. An example of improved pitch measurement precision is given in FIG. 5 where the results are compared between a measurement algorithm of a commercially available scanning electron microscope and an exemplary embodiment of the present invention. The experimental conditions were typical of metrology applications in semiconductor manufacturing industry. In arriving at the results, an identical data set was used for both measurement methods. The metrology tool reports the results of measurement and also stores in memory the profile data used to arrive at the measurement. The stored data profiles for all the measurements were retrieved and analyzed off-line with the method of present invention. Eight different replications of the same feature on a silicon wafer were measured. The wafer was loaded into the system, measured, and unloaded from the system twice using an automated recipe-driven operation. In each cycle, each of the eight features was measured 8 times consecutively, where no feature was moved in between the eight consecutive measurements. For the commercially available measurement method, the pitch measurement precision was slightly more than 1% of nominal size (3 standard deviations). This value is consistent with the precision of pitch measurement for similar metrology tools as reported in the literature in which the 3 standard deviation of measurement ranges from 0.6% to 2% of measured value. The range of pitch measurement precision values can be found in an article entitled "Evaluation of the long-term stability of critical-dimension measurement scanning electron microscope using a calibration standard" by F. Mizuno et al, Journal of Vacuum Science and Technology B, Vol. 15, No. 6, pp. 2177–2180, 1997. For the present experiment, the results for the exemplary embodiment of the invention were improved compared to the commercially available measurement method by a factor of 3. In this exemplary embodiment, the criteria function was obtained by normalized autocorrelation of profile data with background subtraction to result in zero average value of the profile data.

Though improvement in precision is one attribute of the present invention, it is not limited in its application to that purpose. Another issue is the ease of measurement and the requirements for the measurement setup. Prior art measurement methods require defining intervals in the argument x (restricted areas of the image or data set) within which the edge of interest must be found. The methods of present invention, while allowing for this option, do not make it a particular requirement. Thus the methods can be modified to construct the criteria function from the ranges of interest, and hence be a drop in replacement for the operation of existing pitch measurement algorithms.

Furthermore, the methods of present invention do not rely on the sharpness of the image of the edge. When prior art techniques are used for magnification calibration, samples with sharp physical edges are preferred and often required by system manufacturers. Thus, magnification standards are currently required to possess nearly vertical sidewalls so that their cross sections resemble trains of rectangular pulses. In accordance with the present invention, the need for samples with nearly vertical edges for magnification calibration is alleviated. The methods of the present invention would work with periodic structures of any cross section shape such as triangular pulses. In addition, in a light microscope image at high magnifications approaching the resolution limit of light optics where the edge profile is spread due to diffraction and other limitations of a microscope, the pitch measurement can still be easily performed with the methods of the present invention.

The methods of the present invention can further be modified to include only certain portions of the profile data, based on the magnitude of f(x), or incorporate shifts in the signal intensity to add or remove bias from the signal. The criteria function may be computed with or without normalization of the profile data, with or without background subtraction, with or without background signal uniformity compensation, with or without allowance for regions in x of the one-dimensional profile data f(x) that can be defined to be excluded from the computations, and by either truncating the summation or zero padding or replication to represent the translated values of the one-dimensional profile data.

The method of the present invention can easily be extended to measure pitch in the data set in two or more dimensions. In addition to one-dimensional gratings, samples containing two-dimensional arrays of equally sized squares or equally sized disks can be used in metrology and imaging systems. Arrays of squares can be used for establishing the position of the scanned electron beam relative to the stage in electron beam lithography systems. Arrays of disks are used in calibrating electronic circuit test systems that employ ball grid arrays. The methods of present invention, as discussed above, can be applied to each dimension of the data set to obtain the pitch in the data set in that dimension. Alternatively, the criteria function can be constructed in two or more dimensions and the search for the position of the maximum or the minimum of the criteria function can be conducted in two or more dimensions.

While the present invention has been particularly shown and described with reference to the preferred embodiments, it will be understood that the various changes and modifications will occur to those skilled in the art without departing from the scope and true spirit of the invention. The scope of the invention is therefore to be determined solely by the appended claims.

What is claimed is:

1. A method for measuring pitch in data obtained from metrology and imaging systems, the method comprising:

obtaining a data set from a metrology or an imaging instrument;

converting the data set into digital format if not already in that format;

mapping the digitized data set into a one-dimensional profile data if the digitized data set is not already one-dimensional, the one-dimensional profile data being denoted by f(x) being a function of x position values corresponding to equally spaced or nearly equally spaced pixels;

constructing a criteria function g(T) as a one-dimensional data array from the profile data f(x) or any of its derivatives and a translation of the profile data f(x) denote by f(x+T) or any of its derivatives, wherein T represents the amount of translation, and g(T) being a function of T translation values corresponding to equally spaced or nearly equally spaced pixels;

determining a value of translation T either as a whole pixel or with subpixel interpolation such that the magnitude of g(T) would be either a maximum or a minimum whichever appropriate at said value, wherein said value is not zero; and reporting said value as the pitch in the data set.

2. The method of claim 1 wherein said data set is a function of one or more variables including spatial dimensions x, y, z, time, or index in a sequence of images.

3. The method of claim 1 wherein the instrument is any one of cameras including CCD cameras, optical microscopes, scanning electron microscopes including top down, tilt, and cross section; scanning probe microscopes including atomic force microscopes and profilers; scanning ion microscopes; transmission electron microscopes; scanning optical microscopes; microscopes in analytical instruments; defect detection and inspection microscopes whether optical or scanning electron; microscopes in lithography systems including ion beam, x ray, optical, UV, deep UV and extreme UV lithography systems, thermal imaging systems, medical imaging devices such as magnetic resonance imaging, CAT Scan; ultrasound and other imaging systems such as sonar.

4. The method of claim 1 wherein:

the obtained data set is one or more image(s) of portions of a sample, and the one-dimensional profile data f(x) is obtained from the image(s) through one or more mathematical operations including operations on the obtained data set or the one-dimensional profile data to reduce any noise in the data or to shift the average of the data or to remove any linear or higher order trend in the data, summing, averaging with or without weights, median, and averaging with data culling.

5. The method of claim 4 wherein the gray scale image is obtained by one of cameras including CCD cameras, optical microscopes, scanning electron microscope including top down, tilt, and cross section, scanning ion microscope; transmission electron microscope; microscopes in analytical instruments; defect detection and inspection microscopes whether optical or scanning electron; microscopes in lithography systems including ion beam, x ray, optical, UV, deep UV and extreme UV lithography systems, thermal imaging systems, medical imaging devices such as magnetic resonance imaging, CAT Scan; ultrasound and other imaging systems such as sonar.

6. The method of claim 5 wherein:

the criteria function g(T) is constructed from the profile data f(x) and a translation of the profile data f(x) denote by f(x+T) using autocorrelation of either the profile data f(x) or any of its derivatives, and computation of g(T) is performed with or without normalization of profile data f(x) or its derivatives, with or without subtracting a background level from profile data f(x) or its derivatives, with or without excluding portions of the profile data f(x) or its derivatives based on their magnitude, with or without shifts in the magnitude of the profile data f(x) or its derivatives, with or without background uniformity compensation in f(x) or its derivatives, with or without allowance for one or more regions in the argument of the profile data or its derivatives that can be defined to be excluded from the computations, and by either truncating the summation or zero padding or replication to represent the translated values of the profile data or its derivatives, or any combination thereof.

7. The method of claim 6 wherein the reporting act comprises:

reporting one or more parameter(s) to convey information about the quality of the reported pitch.

8. The method of claim 4 wherein:

the criteria function g(T) is constructed from the profile data f(x) and a translation of the profile data f(x) denote by f(x+T) using autocorrelation of either the profile data f(x) or any of its derivatives, and computation of g(T) is performed with or without normalization of profile data f(x) or its derivatives, with or without subtracting a background level from profile data f(x) or its derivatives, with or without excluding portions of the profile data f(x) or its derivatives based on their magnitude, with or without shifts in the magnitude of the profile data f(x) or its derivatives, with or without background uniformity compensation in f(x) or its derivatives, with or without allowance for one or more regions in the argument of the profile data or its derivatives that can be defined to be excluded from the computations, and by either truncating the summation or zero padding or replication to represent the translated values of the profile data or its derivatives, or any combination thereof.

9. The method of claim 8 wherein the reporting act comprises:

reporting one or more parameter(s) to convey information about the quality of the reported pitch.

10. The method of claim 1 wherein:

the data set includes one or more scan profile(s) obtained by scanning one or more time(s) the area of interest on a sample, and the one-dimensional profile data f(x) is obtained from one or more scan profile(s) through one or more mathematical operations including operations on the obtained data set or the one-dimensional profile data to reduce any noise in the data or to shift the average of the data or to remove any linear or higher order trend in the data, summing, averaging with or without weights, median, and averaging with data culling.

11. The method of claim 10 wherein the instrument is one of scanning electron microscope including top down, tilt, and cross section, scanning probe microscope including atomic force microscope and profiler; scanning ion microscope; transmission electron microscope; scanning optical microscope; microscopes in analytical instruments; defect detection and inspection instruments; medical imaging devices such as CAT Scan.

12. The method of claim 11 wherein:

the criteria function g(T) is constructed from the profile data f(x) and a translation of the profile data f(x) denote by f(x+T) using autocorrelation of either the profile data f(x) or any of its derivatives, and computation of g(T) is performed with or without normalization of profile data f(x) or its derivatives, with or without subtracting a background level from profile data f(x) or its derivatives, with or without excluding portions of the profile data f(x) or its derivatives based on their magnitude, with or without shifts in the magnitude of the profile data f(x) or its derivatives, with or without background uniformity compensation in f(x) or its derivatives, with or without allowance for one or more regions in the argument of the profile data or its derivatives that can be defined to be excluded from the computations, and by either truncating the summation or zero padding or replication to represent the translated values of the profile data or its derivatives, or any combination thereof.

13. The method of claim 12 wherein the reporting act comprises:

reporting one or more parameter(s) to convey information about the quality of the reported pitch.

14. The method of claim 10 wherein:

the criteria function g(T) is constructed from the profile data f(x) and a translation of the profile data f(x) denote by f(x+T) using autocorrelation of either the profile data f(x) or any of its derivatives, and computation of g(T) is performed with or without normalization of profile data f(x) or its derivatives, with or without subtracting a background level from profile data f(x) or its derivatives, with or without excluding portions of the profile data f(x) or its derivatives based on their magnitude, with or without shifts in the magnitude of the profile data f(x) or its derivatives, with or without background uniformity compensation in f(x) or its derivatives, with or without allowance for one or more regions in the argument of the profile data or its derivatives that can be defined to be excluded from the computations, and by either truncating the summation or zero padding or replication to represent the translated values of the profile data or its derivatives, or any combination thereof.

15. The method of claim 14 wherein the reporting act comprises:

reporting one or more parameter(s) to convey information about the quality of the reported pitch.

16. The method of claims 1 wherein the criteria function g(T) is constructed from the profile data f(x) and a translation of the profile data f(x) denote by f(x+T) using autocorrelation of either the profile data f(x) or any of its derivatives.

17. The method of claim 1 wherein the computation of g(T) is performed with or without normalization of profile data f(x) or its derivatives, with or without subtracting a background level from profile data f(x) or its derivatives, with or without excluding portions of the profile data f(x) or its derivatives based on their magnitude, with or without shifts in the magnitude of the profile data f(x) or its derivatives, with or without background uniformity compensation in f(x) or its derivatives, with or without allowance for one or more regions in the argument of the profile data or its derivatives that can be defined to be excluded from the computations, and by either truncating the summation or zero padding or replication to represent the translated values of the profile data or its derivatives, or any combination thereof.

18. The method of claim 1 wherein the reporting act comprises:

reporting one or more parameter(s) to convey information about the quality of the reported pitch.

19. The method of claim 18 wherein the one or more parameter(s) include(s) the maximum or the minimum of the criteria function g(T) and the width of the peak or the trough in the vicinity of the corresponding maximum or minimum.

20. The method of claim 1 wherein said pitch in the data set is measured from a sample with a known physical pitch to establish the scale in the data set or the magnification of an image obtained from the system, or to calibrate the system.

21. The method of claim 1 further comprising:

obtaining a measurement for a physical pitch in a sample from said reported pitch, said data set having a known pixel size.

22. A method for measuring pitch in data obtained from metrology and imaging systems, the method comprising:

obtaining a data set from an imaging or metrology instrument;

converting the data set into digital format if not already in that format;

dividing the digitized data set into one or more data subsets;

mapping each digitized data subset into a one-dimensional profile data, each one-dimensional profile data being represented by a corresponding f(x);

constructing a criteria function g(T) from each profile data f(x) and its translation denote by f(x+T), wherein T represents the amount of translation and is varied over a range;

determining a value of translation T for each criteria function such that the magnitude of the corresponding g(T) would be either a maximum or a minimum whichever appropriate at said value, wherein said value is not zero; and reporting a mathematical function of said values for said criteria functions as the pitch in the data set, said mathematical function including one or more of summing, averaging with or without weights, median, and averaging with data culling.

* * * * *